US006787777B1

(12) United States Patent
Gagnon et al.

(10) Patent No.: US 6,787,777 B1
(45) Date of Patent: Sep. 7, 2004

(54) NUCLEAR IMAGING SYSTEM AND METHOD USING SEGMENTED FIELD OF VIEW

(75) Inventors: Daniel Gagnon, Twinsburg, OH (US); Chi-Hua Tung, Aurora, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 478 days.

(21) Appl. No.: 09/710,395

(22) Filed: Nov. 9, 2000

(51) Int. Cl.[7] ............................................. G01T 1/166
(52) U.S. Cl. ............................. 250/363.04; 250/363.1
(58) Field of Search ........................ 250/363.04, 363.1

(56) References Cited

U.S. PATENT DOCUMENTS

| | | | | |
|---|---|---|---|---|
| 5,210,421 A | | 5/1993 | Gullberg et al. | 250/363.04 |
| 5,245,191 A | * | 9/1993 | Barber et al. | 250/363.04 |
| 5,338,936 A | | 8/1994 | Gullberg et al. | 250/363.04 |
| 5,376,795 A | * | 12/1994 | Hasegawa et al. | 250/363.04 |
| 5,672,877 A | * | 9/1997 | Liebig et al. | 250/363.04 |
| 5,917,189 A | * | 6/1999 | N'Guyen | 250/363.1 |
| 6,359,279 B1 | * | 3/2002 | Gagnon et al. | 250/363.1 |

FOREIGN PATENT DOCUMENTS

WO  WO 91/00048  * 1/1991

OTHER PUBLICATIONS

Pixies Advertising Literature (7 pages), Nov. 28, 1999–Feb. 1, 2000.
Ficaro, et al., "Simultaneous Transmission/Emission Myocardial Perfusion Tomography", Circulation 1996;93: 463–473.

* cited by examiner

Primary Examiner—David Porta
Assistant Examiner—Shun Lee
(74) Attorney, Agent, or Firm—Fay, Sharpe, Fagan, Minnich & McKee, LLP

(57) ABSTRACT

A gamma camera includes a plurality of detectors (32, 34) for detecting emission radiation emitted from within a subject and transmission radiation which has traversed a subject to be imaged, the subject attenuating the radiation. Each detector generates position and energy data. At least one transmission radiation source (54, 54') transmits transmission radiation through an examination region (36) to a first segment (74, 74') of the opposite detector. In one embodiment, segment selector circuitry (88) connected with the detectors selectively disables a portion of each detector head during collection of emission data, transmission data, or both. In another embodiment, transmission radiation is received by the first segment (74, 74') simultaneously with emission radiation being received by a second segment (72, 72') of each detector. The first segment is uncollimated or collimated for the transmission radiation source. In SPECT imaging, the second segment carries a collimator for defining trajectories of received emission radiation. A first electronic storage medium (90) connected with the segment selector circuitry stores transmission data and a second electronic storage medium (86) connected with the segment selector circuitry stores emission data. A first reconstruction processor (92) connected with the first electronic storage medium generates a transmission image representation (94). A second reconstruction processor (100, 101) connected with the second electronic storage medium generates an emission image representation (102, 103).

25 Claims, 5 Drawing Sheets

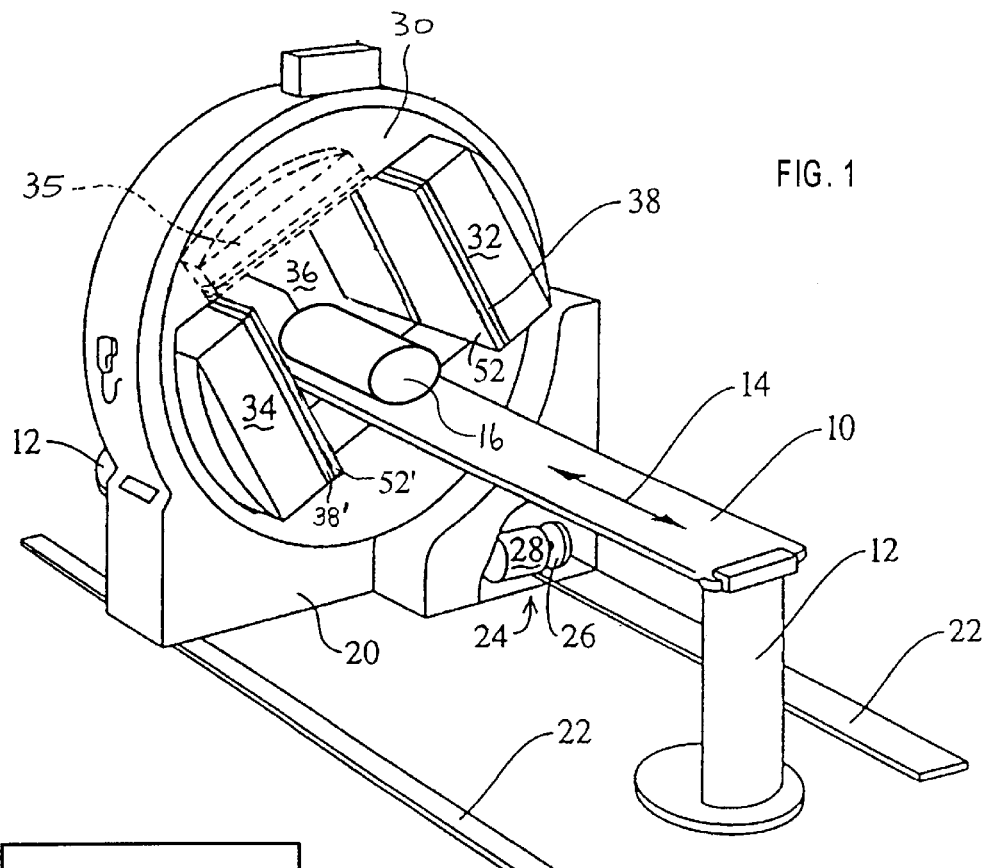
FIG. 1
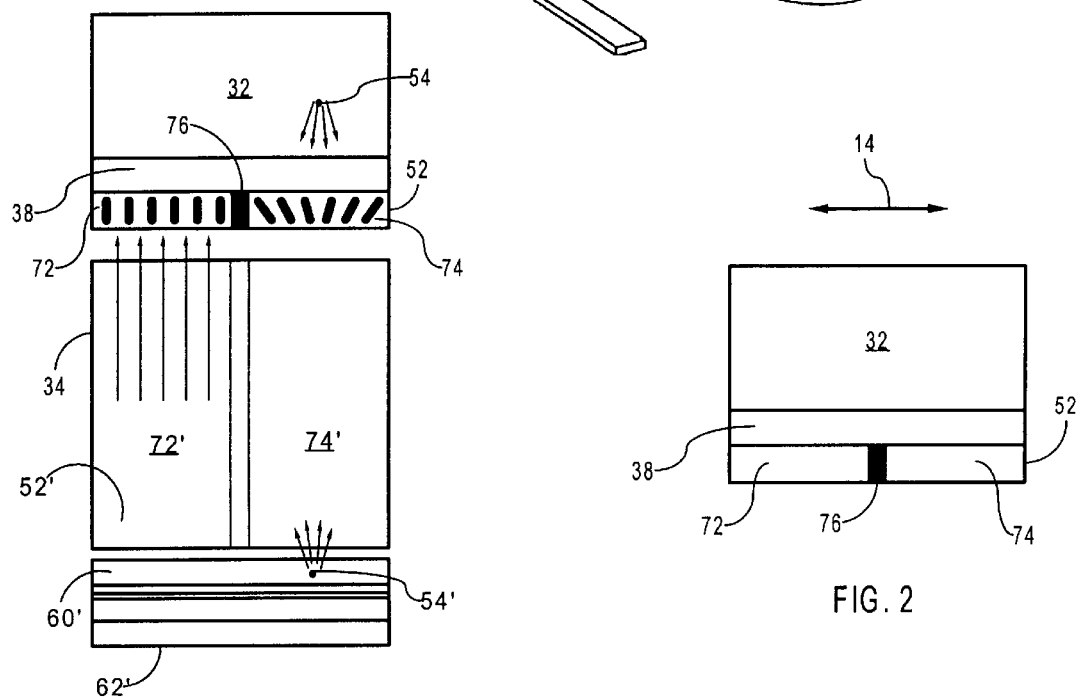
FIG. 4C
FIG. 2

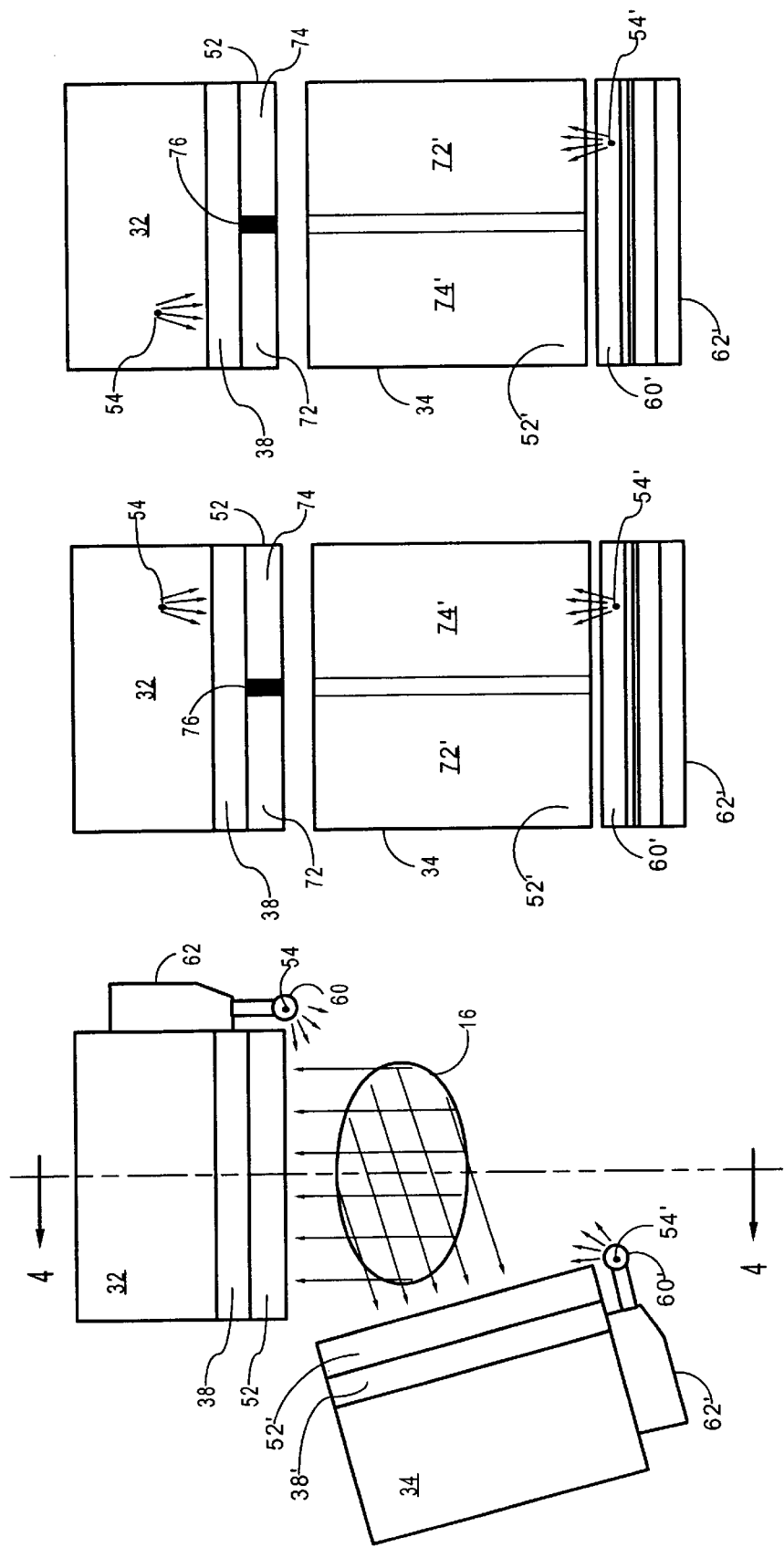

NUCLEAR IMAGING SYSTEM AND METHOD USING SEGMENTED FIELD OF VIEW

BACKGROUND OF THE INVENTION

The present invention relates generally to the art of nuclear medicine. It finds particular application to nuclear imaging techniques and apparatuses employing emission and transmission tomography. Although the present invention is illustrated and described herein primarily in reference to positron emission tomography (PET) and single photon emission computed tomography (SPECT), it will be appreciated that the present invention is also amenable to other noninvasive investigation techniques and other diagnostic modes in which a subject or patient is examined with transmitted radiation.

Diagnostic nuclear imaging is used to study a radionuclide distribution in a subject. Typically, one or more radiopharmaceuticals or radioisotopes are injected into a subject. The radiopharmaceuticals are commonly injected into the subject's blood stream for imaging the circulatory system or for imaging specific organs which absorb the injected radiopharmaceuticals. Gamma or scintillation camera detector heads are placed adjacent to a surface of the subject to monitor and record emitted radiation. For SPECT imaging, collimators are typically placed on the detector heads. For PET imaging, a coincidence detector detects concurrent receipt of a radiation event on two oppositely disposed heads. PET imaging can be performed using a thin collimator or axial filter to minimize stray radiation.

Often, the detector heads are rotated or indexed around the subject to monitor the emitted radiation from a plurality of directions. The monitored radiation data from the multiplicity of directions is reconstructed into a three-dimensional image representation of the radiopharmaceutical distribution within the subject. Such images typically provide functional and metabolic information.

Positron emission tomography (PET) is a branch of nuclear medicine in which a position-emitting radiopharmaceutical, such as $^{18}$F-fluorodeoxyglucose (FDG), is introduced into the body of a subject. Each emitted positron reacts with an electron in what is known as an annihilation event, thereby generating a pair of 511 keV gamma rays for FDG. The gamma rays are emitted in directions 180° apart, i.e., in opposite directions.

A pair of detectors registers the position and energy of the respective gamma rays. Two concurrently received events define a ray which provides information as to the position of the annihilation event and hence the positron source. Because the gamma rays travel in opposite directions, the positron annihilation is said to have occurred along a line of coincidence connecting the detected gamma rays. A number of such events are collected and used to reconstruct a clinically useful image.

Single photon emission computed tomography (SPECT) is another nuclear imaging technique used to study the radionuclide distribution in subjects. Typically, one or more radiopharmaceuticals are injected into a subject. The radiopharmaceuticals are commonly injected into the subject's blood stream for imaging the circulatory system or for imaging specific organs which absorb the injected radiopharmaceuticals. Gamma or scintillation camera heads are placed closely adjacent to a surface of the subject to monitor and record emitted radiation. Collimators mounted on the heads define the trajectory of radiation that is recorded by the head. In SPECT imaging, the detector head or heads are rotated or indexed around the subject to monitor the emitted radiation from a plurality of directions. The monitored radiation emission data from the multiplicity of directions is reconstructed into a three-dimensional image representation of the radiopharmaceutical distribution within the subject.

One of the problems in nuclear imaging techniques such as PET and SPECT is that photon absorption and scatter by portions of the subject between the emitting radionuclide and the camera head(s) distort the resultant image. One solution for compensating for photon attenuation is to assume uniform photon attenuation throughout the subject. That is, the subject is assumed to be completely homogenous in terms of radiation attenuation, with no distinction made for bone, soft tissue, lung, etc. This enables attenuation estimates to be made based on the surface contour of the subject. However, human subjects do not cause uniform radiation attenuation, especially in the chest.

In order to obtain more accurate radiation attenuation measurements, a direct measurement is made using transmission computed tomography techniques. In this technique, radiation is projected from a radiation source through the subject. Radiation that is not attenuated is received by detectors at the opposite side. The source and detectors are rotated to collect transmission data concurrently or sequentially with the emission data through a multiplicity of angles. This transmission data is reconstructed into a transmission image representation using conventional tomography algorithms. The radiation attenuation properties of the subject from the transmission image representation are used to correct for radiation attenuation in the emission data.

Since transmission image data is structural or anatomical in nature; whereas, emission image data is functional or metabolic in nature, it would be desirable to use transmission image data for image localization and/or image registration with a structural image of the same region from another imaging modality. The combination of a functional emission image with a structural transmission image or an image from another imaging modality can provide the diagnostician with insights that could not be obtained with either image alone, thus improving diagnostic accuracy. For example, in the area of oncology, precise positioning of localization of functional images enables a clinician to assess lesion progression and/or treatment effectiveness. Also, such diagnostic studies are used in surgical and/or radiotherapeutic planning, where precise positioning is necessary to minimize the effect on healthy cells surrounding the target cells.

While transmission data has heretofore been largely successful in determining attenuation correction factors for correction of the emission image data, the transmission image data itself has generally been of less than ideal resolution. The coarseness of the images could create uncertainties when localizing the emission image with respect to anatomical features. Also, the quality, and thus diagnostic value, of image registration could be improved with a transmission map of increased quality.

Imaging devices which combine a CT-like device with a gamma camera are known in the art. Typically, the patient is registered with only one of the nuclear and CT devices at a time. Such a combined device is a less than optimal solution to the problem of nuclear medicine image localization due to cost, temporal and spatial registration difficulties, and for logistical reasons. Also, although different modalities are combined in a single system, this type of device retains the conventional approach of addressing separately attenuation correction and precise nuclear medicine image localization.

Transmission image quality can also be increased through increasing the number of counts, i.e., by increasing the source activity, increasing the imaging time, or both. Increasing the source activity, however, has the disadvantage of increasing cost and shielding requirements. Increasing the imaging time is generally undesirable for patient handling reasons. Also, both increasing source activity and increasing imaging time undesirably increase the dose of radiation received by the subject.

It is also known to optimize a collimator for either transmission or emission imaging, however, optimizing for one or the other suffers from the drawback that the two sets of requirements can result in conflicting design parameters. For example, a collimator having a geometry that closely matches the position of the transmission source can increase transmission image quality. However, doing so can impose constraints in terms of geometry and potentially cause truncation of the emission data, known to cause severe artifact in the reconstruction.

Accordingly, the present invention contemplates a new and improved nuclear medicine imaging method and apparatus which overcome the above-referenced problems and others.

SUMMARY OF THE INVENTION

In accordance with a first aspect of the present invention, a method of diagnostic imaging with a nuclear camera which includes a rotating gantry on which at least first and second detector heads are mounted, each of the detector heads carrying an offset transmission radiation source transmitting transmission radiation through an examination region to the other detector head is provided. The method comprises injecting a subject to be imaged with a radiopharmaceutical composition generating emission radiation and during an emission imaging phase, detecting emission radiation events from the radiopharmaceutical composition and generating emission data based on the emission radiation events detected. During a transmission imaging phase, transmission radiation is transmitted through a subject to be imaged, the subject attenuating the transmission radiation. Also during the transmission imaging phase, transmission radiation events are detected and transmission data based on the transmission radiation events are generated, wherein each detector head is configured to collect one or both of emission data and transmission data using only a portion of each detector head.

In a further aspect, a gamma camera includes a plurality of detectors for detecting emission radiation emitted from within a subject and transmission radiation which has traversed a subject to be imaged, the subject attenuating the radiation, each detector generating position and energy data. A plurality of transmission radiation sources each transmit transmission radiation through an examination region to a detector. Segment selector circuitry connected with the detectors selectively disables a portion of each detector head during collection of emission data, transmission data, or both. A first electronic storage medium connected with the segment selector circuitry stores transmission data and a second electronic storage medium connected with the segment selector circuitry stores emission data. A first reconstruction processor connected with the first electronic storage medium generates a transmission image representation. A second reconstruction processor connected with the second electronic storage medium generates an emission image representation.

One advantage of the present invention is that it allows optimization for emission imaging while allowing transmission imaging to be performed at a high count rate.

Another advantage of the present invention is that it provides a highly detailed attenuation map for anatomical localization and image registration.

Another advantage is that nonimaging segments of the detector head can be turned off to reduce the count rate load on the detector during transmission imaging.

Another advantage is that emission and transmission data can be acquired concurrently with optimized acquisition strategies for each.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 1 is a diagrammatic illustration of a nuclear medicine gamma camera in accordance with aspects of the present invention.

FIG. 2 illustrates a nuclear camera detector head segmented in the longitudinal direction in accordance with this teaching.

FIG. 3 is a side view of a first preferred orientation of detector heads in a two head nuclear camera of the present invention employing segmented detector heads.

FIGS. 4A and 4B are partial sectional views taken along line 4—4 in FIG. 3, showing segmentation of the detector heads in accordance with two embodiments of the present invention.

FIG. 4C illustrates a preferred configuration of the embodiment shown in FIG. 4A.

DETAILED DESCRIPTION OF THE PREFERRED EMBODIMENTS

Figure 6B:
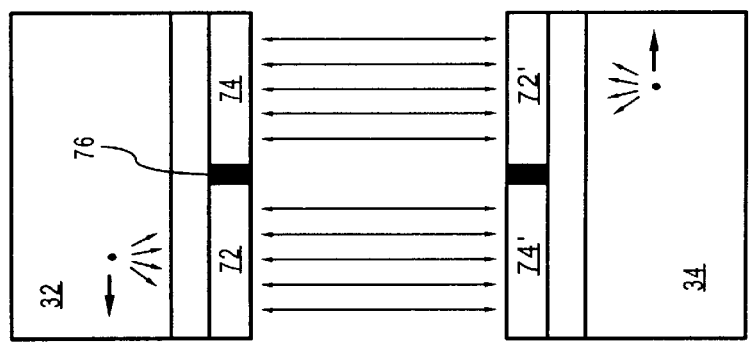
FIGS. 6A and 6B are partial sectional views taken along line 6—6 in FIG. 5, showing segmentation of the detector heads in accordance with two embodiments of the present invention.

With reference to FIG. 1, a diagnostic imaging apparatus includes a subject support 10, such as a table or couch, which is mounted to stationary supports 12 at opposite ends. The table 10 is selectively positionable up and down to position a subject 16 being imaged or examined at a desired location, e.g., so that regions of interest are centered about a longitudinal axis 14.

An outer gantry structure 20 is movably mounted on tracks 22 which extend parallel to the longitudinal axis 14. An outer gantry structure moving assembly 24 is provided for selectively moving the outer gantry structure 20 along the tracks 22 on a path parallel to the longitudinal axis 14. In the illustrated embodiment, the longitudinal moving assembly includes drive wheels 26 for supporting the outer gantry structure 20 on the tracks 22. A motive power source 28, such as a motor, selectively drives one of the wheels which frictionally engages the track 22 and drives the outer gantry structure 20 and supported inner gantry 30 and the detector heads 32 and 34 therealong. Alternatively, the outer gantry structure 20 is stationary and the subject support 10 is configured to move the subject 16 along the longitudinal axis 14 to achieve the desired positioning of the subject 16.

An inner gantry structure 30 is rotatably mounted on the outer gantry structure 20 for stepped or continuous rotation. The rotating inner gantry structure 30 defines a subject receiving aperture 36. One or more detector heads, preferably two or three, are individually positionable on the rotatable inner gantry 30. The illustrated embodiment includes detector heads 32, 34, and optionally a third detector head 35. The detector heads also rotate as a group about the subject receiving aperture 36 and the subject 16, when received, with the rotation of the rotating gantry structure 30. The detector heads are radially, circumferentially, and laterally adjustable to vary their distance from the subject and spacing on the rotating gantry 16 to position the detector heads in any of a variety of angular orientations about, and displacements from, the central axis. For example, separate translation devices, such as motors and drive assemblies, are provided to independently translate the detector heads radially, circumferentially, and laterally in directions tangential to the subject receiving aperture 36 along linear tracks or other appropriate guides. The embodiments described herein employing two detector heads can be implemented on a two detector system or a three detector system. Likewise, the use of three-fold symmetry to adapt the illustrated embodiments to a three detector system is also contemplated.

The detector heads 32, 34, and 35 each include a scintillation crystal, such as a large doped sodium iodide crystal, disposed behind a radiation receiving face 38, 38' that faces the subject receiving aperture 36. The scintillation crystal emits a flash of light or photons in response to incident radiation. The scintillation crystal is viewed by an array of photomultiplier tubes that receive the light flashes and converts them into electrical signals. A resolver circuit resolves the x, y-coordinates of each flash of light and the energy (z) of the incident radiation. That is to say, radiation strikes the scintillation crystal causing the scintillation crystal to scintillate, i.e., emit light photons in response to the radiation. The relative outputs of the photomultiplier tubes are processed and corrected in conventional fashion to generate an output signal indicative of (i) a position coordinate on the detector head at which each radiation event is received, and (ii) an energy of each event. The energy is used to differentiate between various types of radiation such as multiple emission radiation sources, stray and secondary emission radiation, scattered radiation, transmission radiation, and to eliminate noise.

In SPECT imaging, a projection image representation is defined by the radiation data received at each coordinate on the detector head. In SPECT imaging, a collimator defines the rays along which radiation is received.

In PET imaging, the detector head outputs are monitored for coincident radiation events on two heads. From the position and orientation of the heads and the location on the faces at which the coincident radiation is received, a ray between the coincident event detection points is calculated. This ray defines a line along which the radiation event occurred. In both PET and SPECT, the radiation data from a multiplicity of angular orientations of the heads is then reconstructed into a volumetric image representation of the region of interest.

Each of the detector heads 32 and 34 is segmented into a plurality of regions such that only a portion of the field of view (FOV) is imaged during transmission scanning, emission scanning, or both. Optional detector head 35, when utilized, is configured in like manner. The detector heads are segmented by (1) selectively enabling and disabling regions of the detector heads during successive emission and transmission scans and/or (2) employing in an emission imaging region of the detector a collimator suitable for emission imaging (i.e., restricting radiation received by the emission imaging region to radiation traveling along a desired projection path, such as a parallel beam, a cone beam, fan beam collimator, etc.) and employing in a transmission imaging region an open frame crystal or a collimator or axial filter suitable for transmission imaging, such as a collimator or axial filter which matches the geometry of the transmission radiation source or for which the transmission source is substantially penetrating. In the preferred embodiments, the collimator is omitted for the transmission segments of the detectors and an open frame crystal is used. For example, a collimator is not required for a transmission radiation point or line source, or where the transmission radiation is collimated at the source.

FIG. 2 illustrates a detector head, such as the detector head 32, segmented along the axial direction 14. A collimator 52 includes a first region 72 which is configured for single photon emission or positron emission imaging and a second region 74, configured for transmission imaging. In the SPECT embodiment, the region 72 includes a collimator, e.g., parallel beam, cone beam, fan beam, etc., and the region 74 is uncollimated (open frame crystal) or includes a collimator having a geometry matching the transmission beam or for which the transmission radiation is substantially penetrating. The collimator typically absorbs a high percentage of the transmission radiation. The use of an open frame crystal for transmission imaging greatly increases the sensitivity of the device. For a typical configuration, a 10 mCi source in a collimated holder generates about 40–50 Kcps on a 19 mm crystal through a low energy collimator. The same source and arrangement generates between 350–400 Kcps when the collimator is removed. The level of counts available through a collimator is generally sufficient for a general attenuation map for attenuation correction. However, when a greater level of detail is desired from the transmission image, e.g., for anatomical localization or image registration, transmission imaging without a collimator is preferred. Having access to approximately an order of magnitude more counts for transmission imaging can compensate, at least in part, for the fact that only a part of the detector is now available for imaging. Thus, the segmented approach of the present invention is particularly advantageous if a high statistics transmission map or image is required and/or if half of the detector size is sufficient.

FIG. 3 illustrates a two-head embodiment, including a first detector head 32 and a second detector head 34 arranged on the inner gantry structure 30. The configuration of FIG. 3 is suitable for SPECT imaging. A radiation source 54' is mounted on the detector head 34 such that transmission radiation therefrom is directed toward and received by the collimator 52 and the detector head 32. Likewise, radiation source 54 is mounted on the detector head 32 such that transmission radiation therefrom is directed toward and received by the detector head 34 and its collimator 52'. It is to be recognized that a third detector head may optionally be employed, with or without a transmission radiation source mounted thereon in like manner.

In one embodiment, each of the radiation sources 54 and 54' includes a radioactive point source adjustably mounted inside shielded steel cylinders 60 and 60', respectively, which are sealed at the ends. In this configuration, the radioactive point source generates a radiation cone beam which passes through the subject receiving aperture 36. The radiation sources can be rastered along the longitudinal axis 14 longitudinally, thus moving the fan beam across the field of view. The steel cylinder 60 and 60' are adjustably mounted onto the corresponding detector head through pivoting arm mechanisms 62 and 62', respectively, for retraction when the transmission source is not used. Alternately, the radiation source is a line source, flat rectangular source, disk source, flood source, or an x-ray tube.

Referring now to FIG. 4A, there is shown a partial sectional view taken along line 4—4 of the embodiment depicted in FIG. 3. The detector head 32 is segmented, in the direction along longitudinal axis 14, into a first region 72 and a second region 74. A region 76 is preferably provided to isolate the regions 72 and 74. The detector head 34 is segmented into imaging regions 72' and 74' in like manner.

Referring now to FIG. 4C, there is shown a partial sectional view of a preferred configuration of the FIG. 4A embodiment. The detector 32 is segmented, in the direction along longitudinal axis 14, into a first emission imaging region 72 and a second transmission imaging region 74. A region 76 is provided to isolate the regions 72 and 74. The region 72 uses a parallel beam collimation for single photon emission imaging and the region 74 of collimator provides fan beam collimation, e.g., asymmetric fan beam collimation, for transmission imaging. The regions 72' and 74' of the detector 34 are configured in like manner. Alternately, no collimation is used in the regions 74 and 74'.

In operation, the embodiments of FIGS. 4A and 4C employ sequential emission and transmission phases, wherein the gantry is translated longitudinally between the two phases so that the field of view during each phase is aligned with the same region of the subject. The regions 74 and 74' are turned off during the emission imaging phase.

In FIG. 4B, there is shown a configuration which differs from the embodiment of FIG. 4A in that the regions 74' and 72' are reversed on the head 34 relative to the head 32. In operation, single photon emission and transmission imaging are performed simultaneously or sequentially with no longitudinal translation of the gantry between the phases. By alternating the regions in the manner shown in FIG. 4B, a full detector field of view is accommodated without shifting along the longitudinal axis. Together, the detectors provide a full "reconstructible" SPECT data set and a full transmission data set after 360° of rotation. Although the embodiments of FIGS. 4A and 4C are only rotated about 180° before shifting, whereas the FIG. 4B embodiment is rotated 360°, the imaging times for the embodiments are the same since, for the FIG. 4B embodiment, only one subject position is scanned, and the time for longitudinal translation is eliminated.

Figure 5:
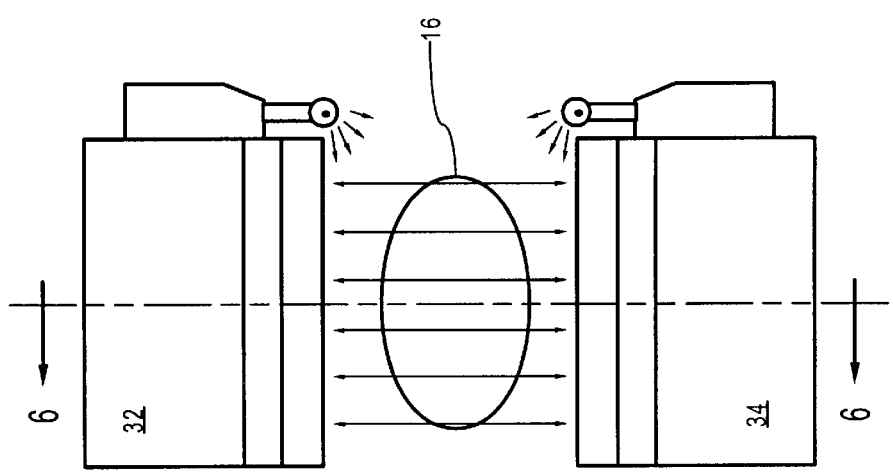
FIG. 5 is a side view of a second preferred orientation of detector heads in a two head nuclear camera of the present invention employing segmented detector heads.

Referring now to FIG. 5, a second detector head configuration, wherein the detector heads are in generally opposing and facing relation and employing a segmented field of view is shown. The arrangement of FIG. 5 is suitable for PET or coincidence imaging.

Figure 6A:
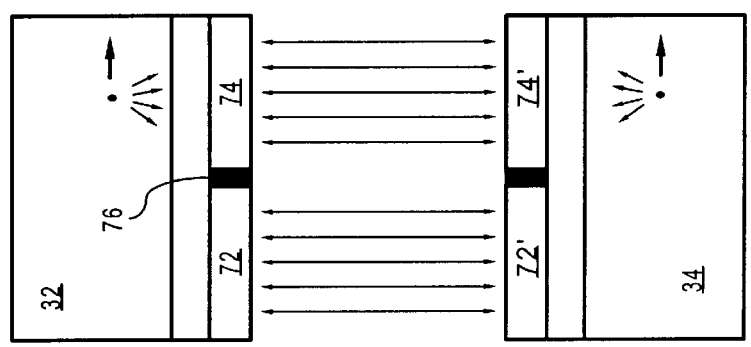

Referring now to FIGS. 6A and 6B, there are shown partial sectional views of two embodiments taken along line 6—6 of the embodiment depicted in FIG. 5. The detector head 32 is segmented, in the direction along longitudinal axis 14, into a first imaging region 72 and a second imaging region 74. A region 76 is preferably provided to isolate the regions 72 and 74. Likewise, the detector head 34 is segmented, in the direction of the longitudinal axis 14, into a first emission imaging region 72' and a second transmission imaging region 74'. In FIG. 6A, the region 72 opposes the region 72' and the region 74 opposes the region 74'. Preferably, the transmission image data is collected in about a half rotation. After a longitudinal shift, emission data is collected from the same region over a half rotation. In FIG. 6B, the region 72 opposes the region 74' and the region 74 opposes the region 72'.

In FIG. 6B, wherein the regions are alternating, PET imaging is performed using a full field of view followed by full field of view transmission imaging on the regions 74 and 74'. The regions 72 and 72' can be turned off during transmission imaging or, alternatively, the regions 72 and 72' can be used for mock scan acquisition during transmission imaging.

The configuration of the detector heads 32 and 34 for various imaging protocols are listed in TABLE 1.

TABLE 1

| | Detector 32 | | Detector 34 | | |
|---|---|---|---|---|---|
| Example | Region 72 | Region 74 | Region 72' | Region 74' | Protocol |
| 1 | Any collimator | Open frame | Any collimator | Open frame | SPECT |
| 2 | Any collimator | Open frame | Open frame | Any collimator | SPECT |
| 3 | Any collimator | Axial filter | Any collimator | Axial filter | SPECT |
| 4 | Any collimator | Axial filter | Axial filter | Any collimator | SPECT |
| 5 | Axial filter | Axial filter | Axial filter | Axial filter | PET |
| 6 | Axial filter | Axial filter | Axial filter | Axial filter | PET |

In Example 1, low-, medium-, or high-energy, sequential emission and transmission imaging is employed with translation of the FOV between the two phases. The regions 74 and 74' (FIG. 4A) of the detectors 32 and 34 are turned off during the emission imaging phase. The regions 72 and 72' are turned off during the transmission imaging phase.

In Example 2, low-, medium-, or high-energy, sequential emission and transmission imaging is employed with no translation of the FOV between the two phases. The region 74 of the detector 32 and the region 72' of the detector 34 (FIG. 4A) are turned off during the emission phase. The region 72 of the detector 32 and the region 74' of the detector 34 are turned off during the transmission phase.

In Example 3, low-, medium-, or high-energy, sequential emission and transmission imaging is employed with translation of the FOV between the two phases. The regions 74 and 74' (FIG. 4A) of the detectors 32 and 34 are turned off during the emission imaging phase. The regions 72 and 72' are turned off during the transmission imaging phase.

In Example 4, low-, medium-, or high-energy, sequential emission and transmission imaging is employed with no translation of the FOV between the two phases. The region 74 of the detector 32 and the region 72' of the detector 34 (FIG. 4A) are turned off during the emission phase. The region 72 of the detector 32 and the region 74' of the detector 34 are turned off during the transmission phase.

In Example 5, full FOV emission (coincidence) imaging is followed by transmission imaging on the region 72 of the detector 32 and the region 74 of the detector 34, with the region 74 of the detector 32 and the region 72' of the detector 34 (FIG. 6A) turned off.

In Example 6, full FOV emission imaging is followed by transmission imaging on the region 72 of the detector 32 and the region 74' of the detector 34 (FIG. 6A). The region 74 of the detector 32 and the region 72' of the detector 34 are used during transmission imaging for acquisition of mock scan data.

Figure 7:
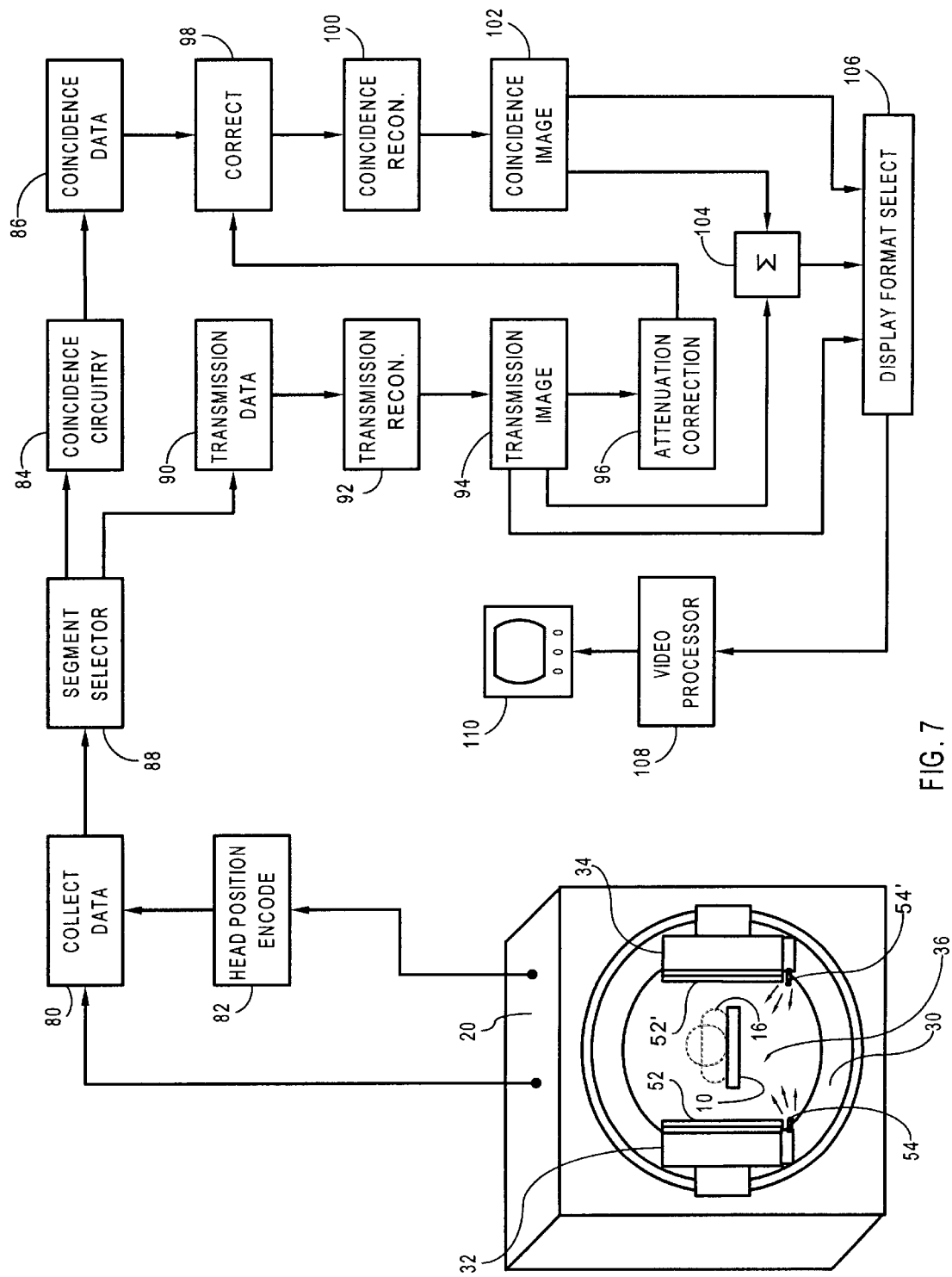
FIG. 7 is an illustration of a coincidence imaging system in accordance with aspects of the present invention.

In reference to FIG. 7, a nuclear medicine imaging apparatus is shown in a configuration suitable for PET imaging in accordance with the present invention. In the embodiment shown, the two detector heads, 32 and 34, are arranged on the rotating gantry 30 on opposite sides of the receiving aperture 36 in facing relation. The receiving faces of the detectors are advantageously aligned in generally parallel planes for receiving the coincidence emission events. A transmission radiation source 54 is mounted on the detector head 32 or the rotating gantry 30 and is collimated such that when its shutter is opened, transmission radiation is directed toward and received by the detector head 34 positioned across the subject receiving aperture from the radiation source. Likewise, a radiation source 54' is mounted on the detector head 34 or the rotating gantry 30 and is collimated such that transmission radiation is directed toward and received by the detector head 32 positioned across the subject receiving aperture from the radiation source.

As the gantry and thus the detectors 32 and 34 are rotated about the subject, the x-y coordinates of radiation events on each head are collected 80, as well as the position and angular orientation of each head from a position sensor or encoder 82. The head position sensor 82 may be, for example, optical, mechanical, or optomechanical. Annihilation radiation events are identified by coincidence circuitry 84 which identifies simultaneous scintillations in both heads and discards noncoincident and piled-up events. The coincidence circuitry 84 also includes a coincidence data processor, e.g., a ray processor, which uses the x, y coordinates and head position information to generate coincidence data which is stored in a coincidence data memory 86. The coincidence events are detected using the entire field of view of heads 32 and 34.

Following collection of the coincidence data 86, transmission data is collected using a segmented field of view in accordance with this teaching. In a first embodiment, the transmission data is collected using aligned facing regions of the detectors 32 and 34, e.g., the regions 74 and 74' of the configuration shown in FIG. 6A. Alternatively, the transmission data is collected using nonfacing regions of the detectors 32 and 34, e.g., the regions 74 and 74' of the configuration shown in FIG. 6B. In another embodiment, one segment of one or both of the detector heads receives the transmission radiation concurrently while the other segments receive emission radiation. Due to the high transmission count rates, the transmission radiation source can be active intermittently, with one segment time sharing between PET and transmission modes.

A segment selector 88 is provided to selectively collect data from the desired regions, e.g., sorting the emission and transmission data based on the x, y coordinates of each head. In some embodiments, the data from the excluded regions is discarded, or more preferably, the unused detector segment is electronically disabled. The regions 72 and 72' can be turned off during transmission scanning, or alternatively, the regions 72 and 72' can acquire emission data concurrently. The segment selector 88 can further include energy discrimination or sorting circuitry to sort emission and transmission events based on detected energies.

Transmission radiation data, including x,y position and head position, are collected 80 from the selected regions of the segmented detectors 32 and 34. Energy discrimination circuitry is optionally included to discard detected events which do not correspond in energy to the transmission radiation sources 54 and 54'. The transmission data are stored in a transmission data memory 90.

A transmission reconstruction processor 92 reconstructs the transmission data stored in the transmission data memory 90 to generate a transmission image representation which is stored in the transmission image memory 94. The reconstruction process can change according to the mode of collection, the nature of the study, and the types of collimators used (i.e., fan, cone, parallel beam, and/or other modes).

The transmission image representation 94 is used to determine attenuation correction factors which are stored in an attenuation factor memory 96. A coincidence data correction processor 98 corrects the emission data in accordance with the attenuation factors 96. For example, for each ray along which coincidence data is received, the coincidence correction processor 98 calculates a corresponding ray through the transmission attenuation factors stored in the memory 96. Each ray of the coincidence data is then weighted or corrected by the coincidence data correction processor 98 inversely with the attenuation factors. The corrected coincidence data are reconstructed by a coincidence reconstruction processor 100 to generate a three-dimensional coincidence image representation that is stored in a volumetric coincidence image memory 102. Alternately, the attenuation correction is performed as a part of the reconstruction process. A combiner circuit 104 is advantageously provided to combine the coincidence and transmission image. A display format selector 106 is also advantageously provided to allow a user to select for viewing the transmission image 94, the coincidence image 102, or a fused coincidence and transmission image. A video processor 108 withdraws selected portions of the data from the image selected for viewing and generates a corresponding human-readable display on a video monitor 110. Typical displays include reprojections, selected slices or planes, surface renderings, and the like. Other human readable output formats, such as printed output, are also contemplated.

Figure 8:
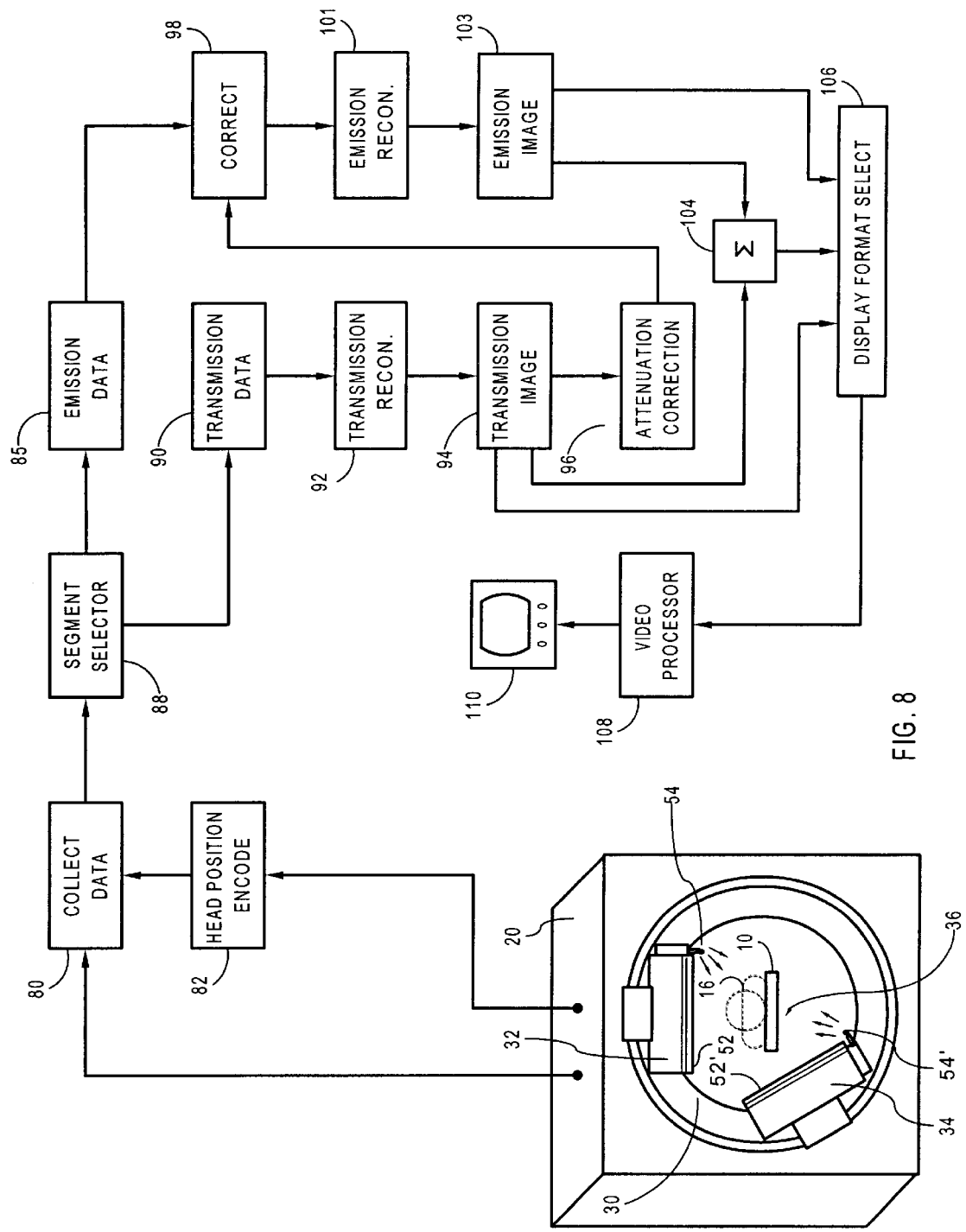
FIG. 8 is an illustration of a single photon emission imaging system in accordance with aspects of the present invention.

In reference to FIG. 8, a nuclear medicine imaging apparatus is shown in a configuration for SPECT imaging in accordance with the present invention. In the embodiment shown, the two detector heads, 32 and 34, are arranged on the rotating gantry 30 about the receiving aperture 36. A transmission radiation source 54 is mounted on the detector head 32 or the rotating gantry 30 and is collimated such that transmission radiation is directed toward and received by one segment of the detector head 34 positioned across the subject receiving aperture from the radiation source. Likewise, another radiation source 54' is mounted on the detector head 34 or the rotating gantry 30 and is collimated such that transmission radiation is directed toward and received by one segment of the detector head 32 positioned across the subject receiving aperture from the radiation source.

As the gantry and thus the detectors 32 and 34 are rotated about the subject, the x-y coordinates of emission and transmission radiation events are collected 80, as well as the position and angular orientation of each head from a position sensor or encoder 82.

In one embodiment, the emission and transmission data are collected sequentially, using the segmented fields of view discussed above. The transmission data is collected using aligned facing regions of the detectors 32 and 34, i.e., the regions 74 and 74' of the detectors 32 and 34, respectively, as illustrated in FIGS. 4A and 4C. In a second embodiment, the transmission data is collected using non-facing regions of the detectors 32 and 34, i.e., the regions 74 and 74' of the detectors 32 and 34, respectively, as illustrated in FIG. 4B. A segment selector 88 is provided to sort emission and transmission data from the desired regions, e.g., sorting the data based on the x, y coordinates, electronically disabling the undesired regions, and so forth. In a third embodiment, the emission and transmission data are collected simultaneously.

The transmission radiation data, including x, y position and detector head position, are collected 80 from the selected regions of the segmented detectors 32 and 34. Energy data may also be included to discard detected events which do not correspond in energy to the transmission radiation source 54. The transmission data are stored in a transmission memory 90.

A transmission reconstruction processors 92 reconstructs the transmission data stored in the transmission data memory 90 to generate a transmission image representation which is stored in the transmission image memory 94. The reconstruction process can change according to the mode of collection, the nature of the study, and the types of collimators used (i.e., fan, cone, parallel beam, and/or other modes).

The transmission image representation 94 is used to determine attenuation correction factors which are stored in an attenuation factor memory 96. An emission data correction processor 98 corrects the emission data from an emission data memory 85 in accordance with the attenuation factors 96. For example, for each ray along which emission data is received, the emission correction processor 98 calculates a corresponding ray through the transmission attenuation factors stored in the memory 96. Each ray of the emission data is then weighted or corrected by the emission data correction processor 98 inversely with the attenuation factors. The corrected emission data are reconstructed by an emission reconstruction processor 101 to generate a three-dimensional emission image representation that is stored in a volumetric emission image memory 103. Alternately, the attenuation correction is performed as a part of the reconstruction process. A combiner circuit 104 is advantageously provided to combine the emission and transmission image. A display format selector 106 is also advantageously provided to allow a user to select for viewing the transmission image 94, the emission image 102, or a fused emission and transmission image. A video processor 108 withdraws selected portions of the data from the image selected for viewing and generates a corresponding human-readable display on a video monitor 110. Typical displays include reprojections, selected slices or planes, surface renderings, and the like. Other human readable output formats, such as printed output, are also contemplated.

The transmission image representation obtained in connection with the embodiments of FIGS. 7 and 8, can be used for anatomical localization of the emission and coincidence images, and for registering such images with an image from another modality, such as a CT, MR, or ultrasound image representation. Accordingly, an image registration processor may advantageously be provided to register a coincidence or emission image representation with a digital image representation acquired from another imaging modality. Because the segmented detector can obtain transmission information in at high count rate, e.g., without a collimator, a more accurate representation of anatomical features is provided. Thus, the emission or coincidence image, which is machine registered to the transmission image is more accurately registered with the other modality image representation. The registered images may then be combined to form a fused or superimposed image representation.

As another alternative, the detector head(s) are segmented into two halves with a dividing line parallel with the longitudinal axis 14. A radiation source is mounted opposite one segment. The other segment is collimated for SPECT imaging. In any given position of the head, one segment of the detector receives emission radiation from one half of the subject and the other segment received transmission radiation, through the other half of the subject. When the head is rotated 180°, emission radiation is received from the opposite half of the subject, and the same for the transmission radiation.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A method of diagnostic imaging with a nuclear camera which includes a rotating gantry on which at least first and second detector heads are mounted, each of the detector heads carrying an offset transmission radiation source transmitting transmission radiation through an examination region to the other detector head, each detector head carrying a collimator which segments the detector head into distinct first and second regions, the method comprising:
   injecting a subject to be imaged with a radiopharmaceutical composition generating emission radiation;
   during an emission imaging phase, detecting emission radiation events from the radiopharmaceutical composition with only the first region of each detector head to generate emission data based on the emission radiation events detected; and
   during a transmission imaging phase, transmitting transmission radiation through a subject to be imaged, the subject attenuating the transmission radiation;
   during the transmission phase, detecting transmission radiation events from the transmission radiation with only the second region of each detector head and generating transmission data based on the transmission radiation events, wherein each detector head is configured to collect emission data, transmission data, or both, using only a portion of each detector head.

2. The method of claim 1, further including: reconstructing a transmission image representation from the transmission data;

using the transmission image representation to generate an attenuation map of the subject;

reconstructing an emission image representation from emission data and the attenuation map.

3. The method of claim 2, further including:

combining the transmission image representation and the emission image representation into a combined image representation.

4. The method of claim 1, wherein the step of detecting emission radiation events comprises detecting single photon emissions from the radiopharmaceutical composition within the subject to generate emission image data.

5. The method of claim 4, wherein the second region is collimated to receive emission radiation and block transmission radiation.

6. The method of claim 4, wherein the emission imaging phase and the transmission imaging phase are performed sequentially.

7. The method of claim 4, wherein the emission imaging phase and the transmission imaging phase are performed simultaneously.

8. The method of claim 1, wherein the gantry and the subject are movable relative to each other in a longitudinal direction, and wherein each detector head is segmented into the first and second regions about a plane orthogonal to said longitudinal direction.

9. The method of claim 1, wherein the step of detecting emission radiation events comprises detecting coincidence radiation events from positron emission radiation to generate emission image data.

10. The method of claim 9, wherein each detector head is segmented into a first region which is not used for collecting transmission data during the transmission imaging phase.

11. The method of claim 9, wherein the gantry is movable in a longitudinal direction and wherein each detector head is segmented into the first and second regions about a plane orthogonal to said longitudinal direction.

12. The method of claim 9, further including collecting mock scan data during the transmission phase with the second region.

13. The method of claim 1 wherein the first region is not used for collecting the transmission data and the second region is not used for collecting the emission data.

14. A method of diagnostic imaging with a nuclear camera which includes a rotating gantry on which at least first and second detector heads are mounted, the gantry being movable in a longitudinal direction, each of the detector heads carrying an offset transmission radiation source transmitting transmission radiation through an examination region to the other detector head, each detector head being segmented about a plane orthogonal to said longitudinal direction into a first region which is not used for collecting emission data and a second region which is used for collecting emission data, the method comprising:

injecting a subject to be imaged with a radiopharmaceutical composition generating emission radiation;

during an emission imaging phase, detecting single photon emission radiation events from the radiopharmaceutical composition with the second region of each detector head to generate emission data based on the emission radiation events detected; and during a transmission imaging phase, transmitting transmission radiation through a subject to be imaged, the subject attenuating the transmission radiation;

during the transmission phase, detecting transmission radiation events from the transmission radiation with the first region of each detector head and generating transmission data based on the transmission radiation events.

15. A method of diagnostic imaging with a nuclear camera which includes a rotating gantry on which at least first and second detector heads are mounted, the gantry being rotatable about a longitudinal direction, each of the detector heads carrying an offset transmission radiation source transmitting transmission radiation through an examination region to the other detector head, each detector head being segmented into the first and second regions about a plane orthogonal to said longitudinal direction, the method comprising:

injecting a subject to be imaged with a radiopharmaceutical composition generating emission radiation;

during an emission imaging phase, detecting emission radiation events from the radiopharmaceutical composition to generate emission data based on the emission radiation events detected with the first region of each detector head; and during a transmission imaging phase, transmitting transmission radiation through a subject to be imaged, the subject attenuating the transmission radiation;

during the transmission phase, detecting transmission radiation events from the transmission radiation and generating transmission data based on the transmission radiation events with the second region of each detector head.

16. The method of claim 15 wherein the emission imaging phase is performed concurrently with the transmission imaging phase.

17. A gamma camera comprising:

a plurality of detectors for detecting emission radiation emitted from within a subject and transmission radiation which has traversed the subject to be imaged, the subject attenuating the radiation, each detector generating position and energy data;

a plurality of transmission radiation sources, each transmission radiation source transmitting transmission radiation through an examination region to one of the detectors;

segment selector circuitry connected with the detectors for selectively disabling a different portion of each detector during collection of each of emission data and transmission data;

a first electronic storage medium connected with the segment selector circuitry storing transmission data;

a second electronic storage medium connected with the segment selector circuitry storing emission data;

a first reconstruction processor connected with the first electronic storage medium which generates a transmission image representation; and a second reconstruction processor connected with the second electronic storage medium which generates an emission image representation.

18. The gamma camera according to claim 17, further including:

a display system for converting one or both of the emission and transmission image representations into a human-viewable image.

19. The gamma camera of claim 17, configured to detect position emission radiation events and generate emission image using the entire field of view of each detector during an emission imaging phase, and to detect transmission radiation events and generate transmission image data using only a first portion of each detector.

20. The gamma camera of claim 19, wherein a second portion of each detector is configured to acquire mock scan data during the transmission imaging phase.

21. A gamma camera comprising:

a rotating gantry mounted for rotation about a longitudinal axis;

a plurality of detector heads for detecting emission radiation emitted from within a subject and transmission radiation which has traversed the subject to be imaged, the detector heads being mounted to the rotating gantry, the subject attenuating the radiation, each detector head generating position and energy data at least one detector head being segmented along a plane orthogonal to the longitudinal axis into a first portion for detecting emission radiation events for generating emission image data and a second portion for detecting transmission radiation events and generating transmission data;

at least one transmission radiation source which transmits transmission radiation through the subject to the segmented detector head;

an electronic storage medium which stores the transmission data and the emission data;

a reconstruction processor which reconstructs the emission data and the transmission data into at least one electronic image representation.

22. A gamma camera comprising:

a plurality of detectors for detecting emission radiation emitted from within a subject and transmission radiation which has traversed the subject to be imaged, the subject attenuating the radiation, each detector generating position and energy data;

a collimator for restricting radiation received by an emission imaging region of at least one of the detector heads only to emission radiation traveling along a desired projection path;

a plurality of transmission radiation sources, each transmission radiation source transmitting transmission radiation through an examination region to one of the detectors, the collimator blocking the transmission radiation from being received by the emission imaging region and enabling transmission radiation to be received by a transmission imaging region of the at least one detector head;

an electronic storage medium connected with the segment selector circuitry storing transmission data collected by the transmission imaging region and storing emission data collected by the emission imaging region;

a reconstruction processor connected with the first electronic storage medium and to generate an image representation.

23. The gamma camera of claim 22, wherein over the transmission imaging region, the collimator matches a geometry of the transmission radiation source.

24. The gamma camera of claim 22, wherein the transmission imaging region is uncollimated.

25. A gamma camera comprising:

a detector head having a radiation receiving face that is segmented into side-by-side first and second portions;

a radioisotope transmission radiation source disposed across an examination region from the first portion of the radiation receiving face;

a drive for moving the detector head and the radiation source around the examination region;

a SPECT collimator mounted to the second portion of the radiation receiving face; and one of an axial filter, a transmission radiation collimator, and no collimator covering the first portion of the radiation receiving face.

* * * * *